US007366313B2

(12) United States Patent
Kato

(10) Patent No.: US 7,366,313 B2

(45) Date of Patent: Apr. 29, 2008

(54) MIXING CONSOLE HAVING VISUAL MARKING SYSTEM APPLIED TO MANUAL OPERATORS WITH SUBGROUPING

(75) Inventor: Kojiro Kato, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 782 days.

(21) Appl. No.: 10/677,056

(22) Filed: Sep. 30, 2003

(65) Prior Publication Data

US 2004/0066943 A1 Apr. 8, 2004

(30) Foreign Application Priority Data

Oct. 4, 2002 (JP) ............................. 2002-292330

(51) Int. Cl.
*H04B 1/00* (2006.01)

(52) U.S. Cl. ........................... 381/119; 381/119; 369/3; 369/4; 400/487

(58) Field of Classification Search ................ 381/119, 381/109, 104, 124; 369/3, 4; 400/487
See application file for complete search history.

(56) References Cited

U.S. PATENT DOCUMENTS

| | | | | |
|---|---|---|---|---|
| 4,940,346 A * | 7/1990 | Liljenquist | 400/487 |
| 5,402,501 A * | 3/1995 | Silfvajt et al. | 381/119 |
| 5,452,960 A * | 9/1995 | Kuhlenschmidt | 400/487 |
| 5,626,429 A * | 5/1997 | Choate | 400/487 |
| 5,700,097 A * | 12/1997 | Kuhlenschmidt | 400/487 |
| 5,959,610 A * | 9/1999 | Silfvast | 345/156 |
| 6,728,382 B1 * | 4/2004 | Silfvast | 381/119 |
| 6,839,441 B1 * | 1/2005 | Powers et al. | 381/119 |
| 2003/0059066 A1 * | 3/2003 | Kohyama et al. | 381/119 |

FOREIGN PATENT DOCUMENTS

| | | |
|---|---|---|
| JP | 63-199319 U | 12/1988 |
| JP | 05-251950 | 9/1993 |
| JP | 08-032378 | 2/1996 |
| JP | 09-312537 | 2/1997 |
| JP | 09-198953 | 7/1997 |

* cited by examiner

*Primary Examiner*—Xu Mei
*Assistant Examiner*—Disler Paul
(74) *Attorney, Agent, or Firm*—Morrison & Foerster LLP

(57) ABSTRACT

In a mixing console apparatus, an input section inputs a plurality of electric signals, a processing section processes the inputted electric signals, and an output section outputs the processed electric signals. A plurality of operators are provided in correspondence to a plurality of circuit components contained in those of the input section, the processing section and the output section, and are assigned with various functions in correspondence to the respective circuit components. The operators are manually operable to act on the corresponding circuit components for controlling the electric signals. The plurality of the operators are arranged to form at least one group operation section such that the operators having similar functions are grouped into the same group operation section. The group operation section is divided into subgroups with markings such that operators belonging to one subgroup is distinguished from operators belonging to another subgroup by the respective markings.

4 Claims, 5 Drawing Sheets

MIXING CONSOLE HAVING VISUAL MARKING SYSTEM APPLIED TO MANUAL OPERATORS WITH SUBGROUPING

BACKGROUND OF THE INVENTION

1. Technical Field of the Invention

The present invention relates to a mixing console for outputting a plurality of audio signals through a plurality of channels of a bus system.

2. Prior Art

Mixing consoles have been conventionally used at broadcast stations, recording studios, or concert halls. In order to output audio signals such as the sounds of various musical instruments and vocals as player's monitor outputs or mixer's monitor outputs, it is necessary to perform various control operations (signal processing) on many signals. To this end, various kinds of many operators are arranged on an operation panel in such a manner as to improve the operationality of the operation panel and to take the load off a human operator.

For example, Japanese Patent Unexamined Publication No. 09-198953 discloses a technique for changing colors of fader knobs so that it helps detect the position of the respective fader knobs at a glance merely by identifying the colors, such as red, green, yellow, etc.

Japanese Patent Unexamined Publication No. 05-251950 is referenced as another prior art document.

The above-mentioned prior art can just emphasize the distinction of differences in color among the fader knobs, but not teach the structure in which no further effects can be expected.

SUMMARY OF THE INVENTION

It is an object of the present invention to further improve the operationality of a mixing console in such a manner as to allow easy checking of the order and arrangement of many manual operators on the mixing console, and the interrelationship of the operators.

According to a first aspect of the invention, there is provided a mixing console apparatus comprising an input section that inputs a plurality of electric signals, a processing section that processes the inputted electric signals, an output section that outputs the processed electric signals, and a plurality of operators being provided in correspondence to a plurality of circuit components contained in those of the input section, the processing section and the output section, and being assigned with various functions in correspondence to the respective circuit components, the operators being manually operable to act on the corresponding circuit components for controlling the electric signals, wherein the plurality of the operators are arranged to form at least one group operation section such that the operators having similar functions are grouped into the same group operation section and wherein the group operation section is divided into subgroups with markings such that operators belonging to one subgroup is distinguished from operators belonging to another subgroup by the respective markings. Typically, the markings are colors applied to the operators. In such a case, different colors are allocated to different subgroups to distinguish from each other. Preferably, the different colors are allocated in the order determined by brightness thereof to the different subgroups.

The mixing console apparatus having the above construction allows a human operator to recognize the arrangement of manual operators on a subgroup basis, thereby making it easy for the human operator to find a target operator.

According to a second aspect of the invention, there is provided a mixing console apparatus comprising an input section that inputs a plurality of electric signals, a processing section that processes the inputted electric signals, an output section that outputs the processed electric signals, and a plurality of operators being provided in correspondence to a plurality of circuit components contained in those of the input section, the processing section and the output section, and being assigned with various functions in correspondence to the respective circuit components, the operators being manually operable to act on the corresponding circuit components for controlling the electric signals, wherein the plurality of the operators are grouped to form two or more of group operation sections such that operators having similar functions are grouped into the same group operation section, wherein each group operation section is divided into subgroups with markings from a top subgroup to a last subgroup such that operators belonging to one subgroup is distinguished from operators belonging to another subgroup by the respective markings, and wherein the respective top subgroups of the respective group operation sections are applied with the same marking. Typically, the markings are colors applied to the operators. In such a case, different colors are allocated to different subgroups to distinguish from each other in the same group operation section. Preferably, the different colors are allocated in an order determined by brightness thereof to the top subgroup through the last subgroup in the same group operation section.

According to the mixing console apparatus as constructed above, since respective top subgroups in the plurality of group operation sections have the same marking, the mixing console obtains not only the same effects as the first aspect of the invention, but also make it easy to distinguish one group operation section from another, and hence to find the top of the operators of the distinguished group operation section.

According to a third aspect of the invention, there is provided a mixing console apparatus comprising an input section that inputs a plurality of electric signals, a processing section that processes the inputted electric signals, an output section that outputs the processed electric signals, and a plurality of operators being provided in correspondence to a plurality of circuit components contained in those of the input section, the processing section and the output section, and being assigned with various functions in correspondence to the respective circuit components, the operators being manually operable to act on the corresponding circuit components for controlling the electric signals, wherein the plurality of the operators are grouped to form two or more of group operation sections such that operators having similar functions are grouped into the same group operation section, wherein each group operation section is divided into a sequence of subgroups with markings such that operators belonging to one subgroup is distinguished from operators belonging to another subgroup by the respective markings, and wherein the markings have a predetermined order, such that the markings are applied sequentially to the sequence of the subgroups in the same manner among the respective group operation sections according to the predetermined order. Typically, the markings are colors applied to the operators. In such a case, the colors are applied sequentially to the sequence of the subgroups in the same manner among the respective group operation sections according to the predetermined order which is predetermined according to brightness of the colors. Preferably, the predetermined order of the colors is predetermined according to brightness of the colors such that a color having a higher brightness is applied to a first one of the subgroups in the sequence and another color having a lower brightness is applied to a last one of the subgroups in the sequence.

According to the mixing console apparatus as constructed above, since the order of subgroups of the plurality of group operation sections corresponds to the order of kinds of markings, the mixing console obtains not only the same effects as the first aspect of the invention, but also make it easy to recognize the order of subgroups, thereby improving opeationality.

According to a fourth aspect of the invention, there is provided a mixing console apparatus comprising an input section that inputs a plurality of electric signals, a processing section that processes the inputted electric signals, an output section that outputs the processed electric signals, a bus system connecting between the input section and the output section through the processing section, and a plurality of operators being provided in correspondence to a plurality of circuit components of the processing section disposed on the bus system and are assigned with various functions in correspondence to the respective circuit components, the operators being manually operable to act on the corresponding circuit components for processing the electric signals, wherein the plurality of the operators are arranged to form a first group operation section and a second group operation section, such that operators corresponding to circuit components disposed on an input side of the bus system are grouped into the first group operation section and operators corresponding to circuit components disposed on an output side of the bus system are grouped into the second group operation section, wherein the first group operation section is divided into subgroups with markings such that operators belonging to one subgroup is distinguished from operators belonging to another subgroup by the respective markings, and the second group operation section is divided into subgroups in correspondence to the subgroups of the first group operation section with markings such that operators belonging to one subgroup is distinguished from operators belonging to another subgroup by the respective markings, and wherein the subgroup of the first group operation section has the same marking as that of the corresponding subgroup of the second group operation section. Typically, the markings are colors applied to the operators.

According to the mixing console apparatus as constructed above, since the correspondence between the first and second group operation sections can be recognized with the markings, the mixing console can obtain not only the same effects as those of the first inventive mixing console apparatus, but also improve operatinality.

DETAILED DESCRIPTION OF THE INVENTION

Figure 5:
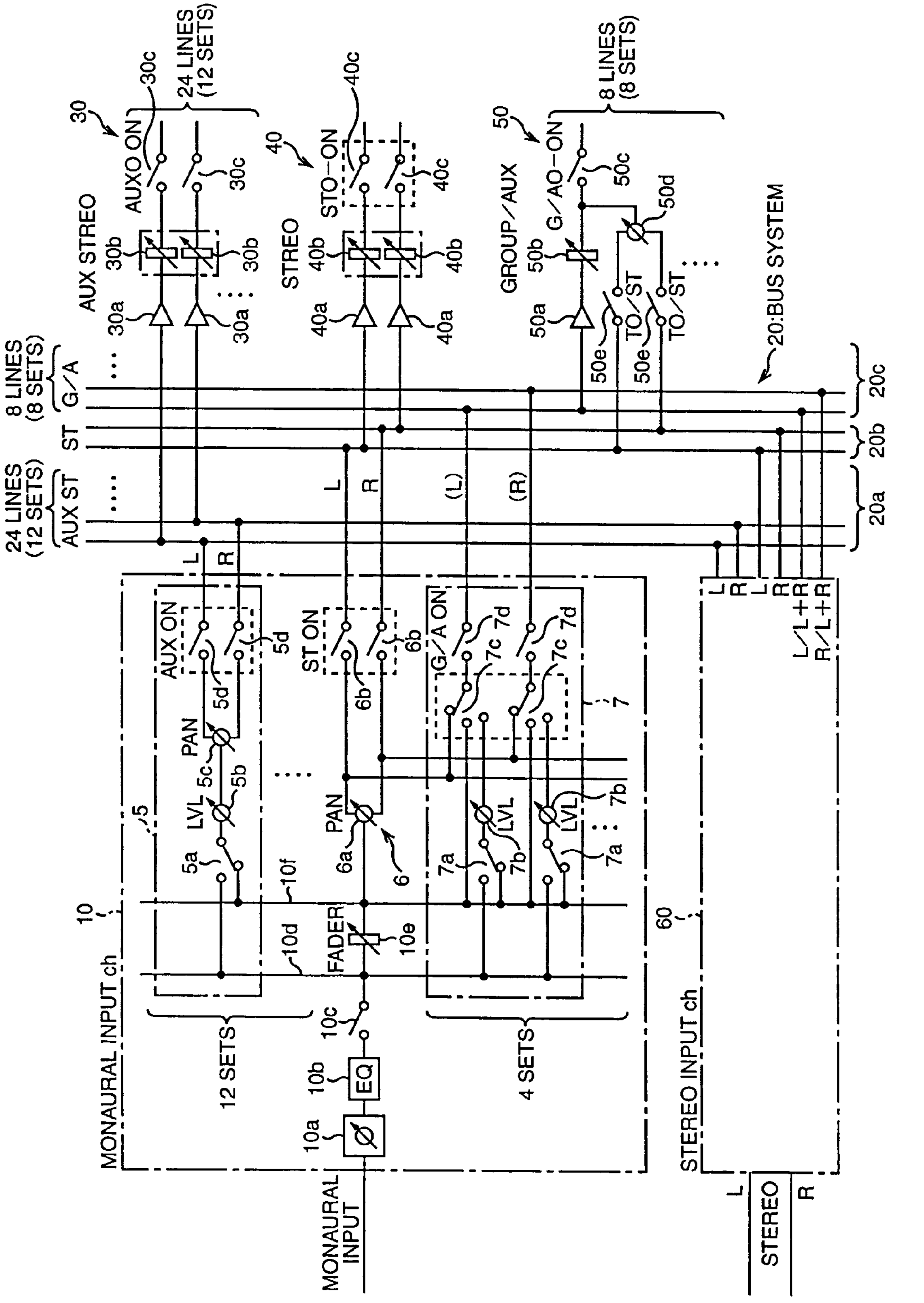
FIG. 5 is a partial circuit diagram of the mixing console according to the embodiment of the present invention.

An embodiment will now be described with reference to the accompanying drawings. FIG. 5 is a partial circuit diagram of a mixing console according to the embodiment. In FIG. 5, one input channel out of many input channels is shown. Since a monaural input channel 10 is provided with more channels than a stereo input channel 60, the number of operators would be enormous. Therefore, as will be described later with respect to operators, the embodiment takes an example in which the present invention is applied to operators in the monaural input channel 10.

An audio signal for one channel is input into the monaural input channel 10 in which it is input to a first common signal line 10*d* through a gain control volume 10*a*, an equalizer circuit 10*b*, and a channel ON switch 10*c*. Then, it is input to a second common signal line 10*f* through a fader 10*e*. The signals appearing across the first and second common signal lines 10*d* and 10*f* are supplied to AUX stereo send level control circuits 5, a stereo send level control circuit 6, and GROUP/AUX send level control circuits 7.

In each of the AUX stereo send level control circuits 5, a preswitch 5*a* changes between the signal through the fader 10*e* and the signal not through the fader 10*e*. A level volume 5*b* and a pan volume 5*c* are coaxial (pluriaxal) volumes, to be described later, for adjusting the level and panning, respectively. The signal, the level of which has been adjusted by the level volume 5*b*, is then subjected to panning adjustment by the pan volume 5*c*. L and R signals after subjected to panning adjustment by the pan volume 5*c* are output to a bus system 20. Although indicated in the drawing with the omission mark ( . . . ), 12 channels (12 sets) of AUX stereo send level control circuits 5 are provided in parallel in one monaural input channel 10.

The stereo send level control circuit 6 adjusts the panning of the signal input through the fader 10*e* by means of a pan volume 6*a*, and L and R signals after subjected to panning adjustment are output to the bus system 20 through stereo ON switches 6*b*, 6*b*, respectively.

Each of the GROUP/AUX send level control circuits 7 has two sets of circuits provided for the L and R signals of the stereo send level control circuit 6. In respective sets of circuits, preswitches 7*a*, 7*a* change between the signal through the fader 10*e* and the signal not through the fader 10*e*. Level volumes 7*b*, 7*b* are monoaxial volumes, to be described later, for adjusting the levels of signals selected at the preswitches 7*a*, 7*a*. The signals, the levels of which have been adjusted, are input to mode switches 7*c*, 7*c*. The signals across the second common signal line 10*f* are also input to the mode switches 7*c*, 7*c*. Further, the L and R signals after subjected to panning adjustment through the stereo send level control circuit 6 are input to the mode switches 7*c*, 7*c*.

The mode switches 7*c*, 7*c* are switches not having operators on the panel. The mode switches 7*c*, 7*c* are changed by selecting the mode. Then the L and R signals of the stereo send level control circuit 6, the signals across the second common signal line 10*f*, or the signals with the levels adjusted by the level volumes 7*b*, 7*b* are selected at the mode switches 7*c*, 7*c*. The selected signals (for example, the L and R signals) are output to the bus system 20 through G/A ON switches 7*d*, 7*d*. Although indicated in the drawing with the omission mark ( . . . ), four channels (four sets) of GROUP/AUX send level control circuits 7 are provided in parallel in one monaural input channel 10.

The bus system 20 is made up of 24 AUX stereo bus lines (AUX ST) 20*a* corresponding to 24 output lines for 12 sets of AUX stereo send level control circuits 5, two stereo bus lines (ST) 20*b* corresponding to two output lines of the stereo send level control circuit 6, and eight GROUP/AUX bus lines (G/A) 20*c* corresponding to eight output lines for four sets of GROUP/AUX send level control circuits 7.

The AUX stereo bus lines 20*a* are connected to respective AUX stereo output level control circuits (AUX STEREO) 30. 12 sets of AUX stereo output level control circuits 30 are provided for 12 sets of L and R signals of the AUX stereo level control circuits 5. Signals from each set of AUX stereo bus lines 20*a* are output to the outside through mixers 30*a*, 30*a*, faders 30*b*, 30*b*, and AUX output ON switches (AUX-ON) 30*c*, 30*c*. Note that one set of faders 30*b*, 30*b* are controlled by the same fader operator to be described later.

The stereo bus lines (ST) 20*b* are connected to a stereo output level control circuit (STEREO) 40. This stereo output level control circuit 40 is of two-system type, respectively provided for L and R signals of the stereo send level control circuit 6. Signals from the stereo bus lines 20*b* are output to the outside through mixers 40*a*, 40*a*, faders 40*b*, 40*b*, and stereo output ON switches (STO-ON) 40*c*, 40*c*.

THE GROUP/AUX bus lines 20*c* are connected to respective GROUP/AUX output level control circuits (GROUP/AUX) 50. Eight sets of GROUP/AUX output level control circuits 50 are provided for eight signal lines for four sets of L and R signals of the GROUP/AUX send level control circuits 7. A signal from each GROUP/AUX bus line is output to the outside through a mixer 50*a*, a fader 50*b*, and a GROUP/AUX output ON switch (G/AO-ON) 50*c*. the output signal of the fader 50*b* is also output to the set of stereo bus lines (ST) 20*b* through a pan volume 50*d* and stereo output ON switches (TO-ST) 50*e*, 50*e*. In other words, each of the GROUP/AUX output level control circuits 50 is allowed to supply the set of stereo bus lines 20*b* with outputs of each set of GROUP/AUX bus lines 20*c* as L and R signals after subjected to panning adjustment. It allows various signals from the GROUP/AUX bus lines 20*c* to be mixed and output from the stereo output level control circuit 40 to the outside.

On the other hand, stereo audio signals L and R for one channel are input into one stereo input channel 60. The input stereo audio signals L and R are subjected to level adjustment and balance adjustment in such a manner that they will correspond to the AUX stereo bus lines 20*a*, stereo bus lines 20*b*, and GROUP/AUX bus lines 20*c*. The adjusted signals L and R are then output to each of the bus lines 20*a*, 20*b*, and 20*c*. Note that a mixed signal (L+R) of the L and R signals may be selectively output to each corresponding set of GROUP/AUX bus lines 20*c*.

According to the above-mentioned structure, for example, an audio signal input to one monaural channel 10 can be subjected to various processing and output to the outside through multiple channels. For example, an audio signal can be subjected to level adjustment and panning adjustment through the AUX stereo send level control circuits 5 and output from 12 channels to the outside through the AUX stereo bus lines 20*a* and the AUX stereo output level control circuits 30. The audio signal can also be subjected to panning adjustment through the stereo send level control circuit 6 and output from one channel to the outside through the stereo bus lines 20*b* and the stereo output level control circuit 40. Further, the audio signal can be subjected to level adjustment through the GROUP/AUX send level control circuits 7 and output from eight channels to the outside through the GROUP/AUX bus lines 20*c* and the GROUP/AUX output level control circuits 50.

Although not shown in the circuit diagram, each audio signal input to the other many monaural input channels can also be output in the same manner from 12 channels of the AUX stereo output level control circuits 30, one channel of the stereo output level control circuit 40, and eight channels of the GROUP/AUX output level control circuits 50. In other words, various kinds of multiple audio input signals can be mixed and output through multiple channels.

For example, multiple audio signals of a set of drums and other musical instruments, such as audio signals of multiple vocals, can be input, mixed after subjected to various processing such as level adjustment and panning adjustment, and output as signals for each player's monitor, thus obtaining various mixing features.

The levels (send levels) of signals to be output to the AUX stereo bus lines 20*a* are adjusted by the 12 sets of AUX stereo send level control circuits 5, while the levels of the signals extracted from the AUX stereo bus lines 20*a* are adjusted by the 12 sets of AUX stereo output level control circuits 30 corresponding to the 12 sets of AUX stereo send level control circuits 5. On the other hand, the levels (send levels) of signals to be output to the GROUP/AUX bus lines 20*c* are adjusted by the four sets (eight channels) of GROUP/AUX send level control circuits 7, while the levels of the signals extracted from the GROUP/AUX bus lines 20*c* are adjusted by the eight sets of GROUP/AUX output level control circuits 50 corresponding to the eight channels of GROUP/AUX send level control circuits 7.

In other words, as will be described later, a pair of (coaxial) volume operators (12 pairs in total) for each pair of level volume 5*b* and pan volume 5*c* in each of the AUX stereo send level control circuits 5 corresponds to the same fader operator (12 in total) for each pair of faders 30*b*, 30*b* in each of the AUX stereo output level control circuits 30. On the other hand, volume operators (eight in total) for respective level volumes 7*b* in the GROUP/AUX send level control circuits 7 correspond to fader operators (eight in total) for respective faders 50*b* in the GROUP/AUX output level control circuits 50.

Figure 3:
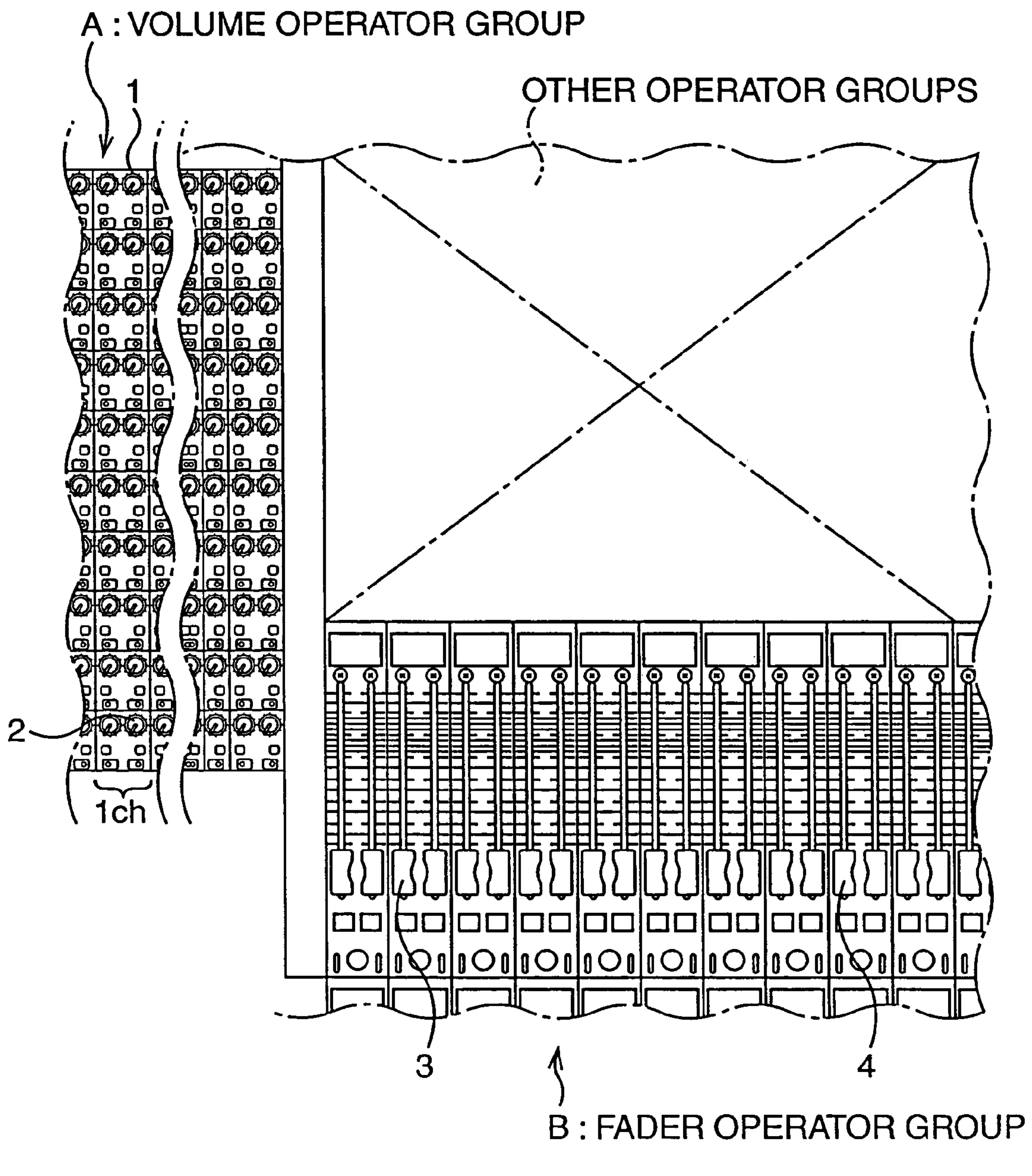
FIG. 3 shows part of a panel on the mixing console according to the embodiment of the present invention.

FIG. 3 shows part of the panel of the mixing console according to the embodiment. Volume operator group A is arranged on the panel. The volume operator group A consists of volume operators 1 for level volumes 5*b* and 5*c* in the AUX stereo send level control circuits 5, and volume operators 2 for level volumes 7*b* in the GROUP/AUX send level control circuits 7. Fader operator group B is also arranged on the panel. The fader operator group B consists of fader operators 3 for faders 30*b*, 30*b* in the AUX stereo output level control circuits 30, and fader operators 4 for faders 50*b* in the GROUP/AUX output level control circuits 50. Although not shown in this drawing, operators for the gain control volumes 10*a* and operators for the equalizer circuits 10*b* are arranged above (at the back of) the volume operator group A, while operators for the channel ON switches 10*c* and operators for the faders 10*e* are arranged below (at the front of) the volume operator group A.

Figure 1:
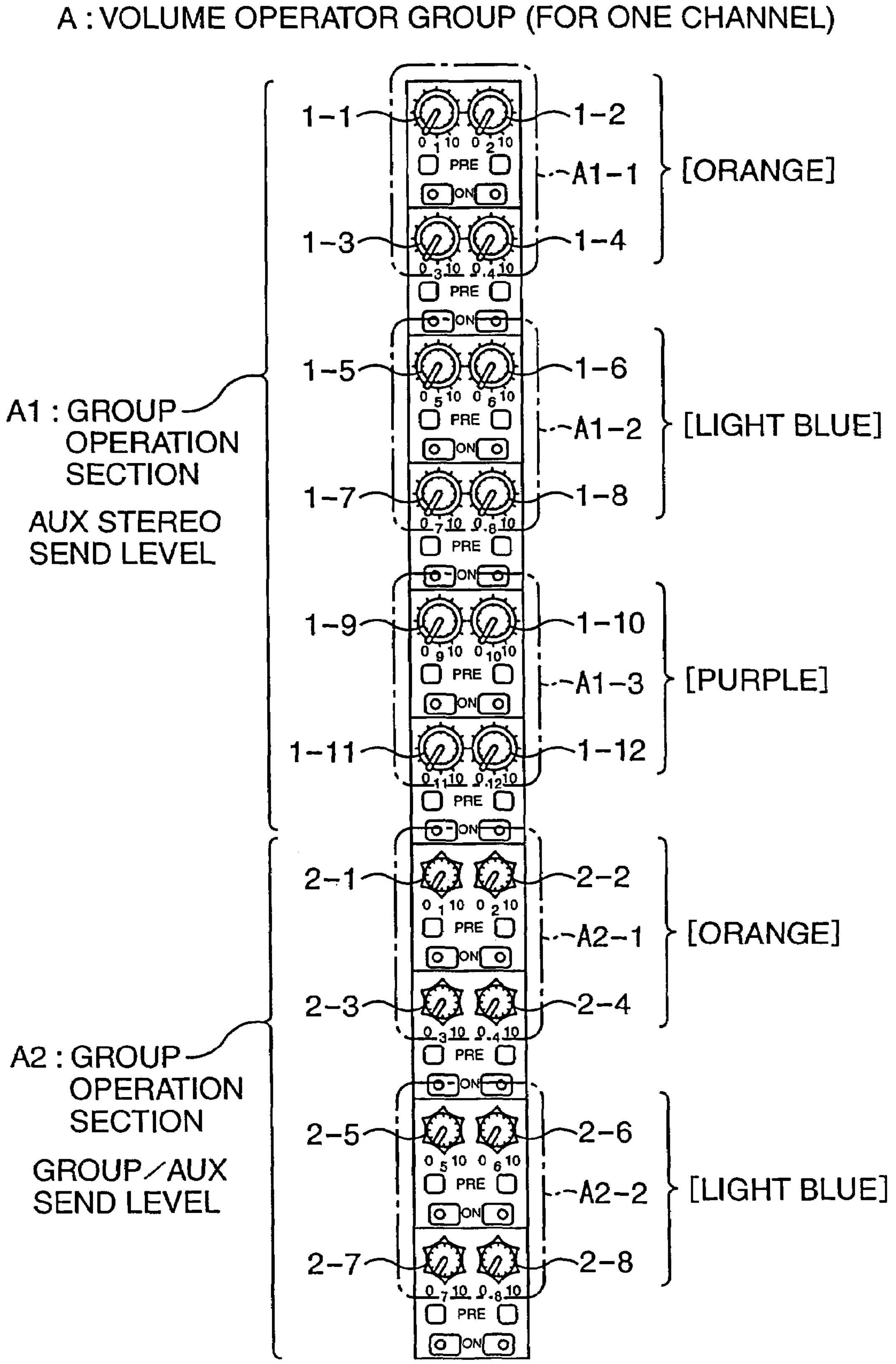
FIG. 1 is a plan view showing a volume operator group on a mixing console according to an embodiment of the present invention.

FIG. 1 is a plan view showing the volume operator group A for one channel. The volume operator group A is divided into two group operation sections A1 and A2. The group operation section A1 consists of 12 volume operators 1-1 to 1-12 having similar functions for level volumes 5*b* and pan volumes 5*c* in the AUX stereo send level control circuits 5 (12 sets in total). The group operation section A2 consists of eight volume operators 2-1 to 2-8 for level volumes 7*b* in the GROUP/AUX send level control circuits 7.

Figure 4:
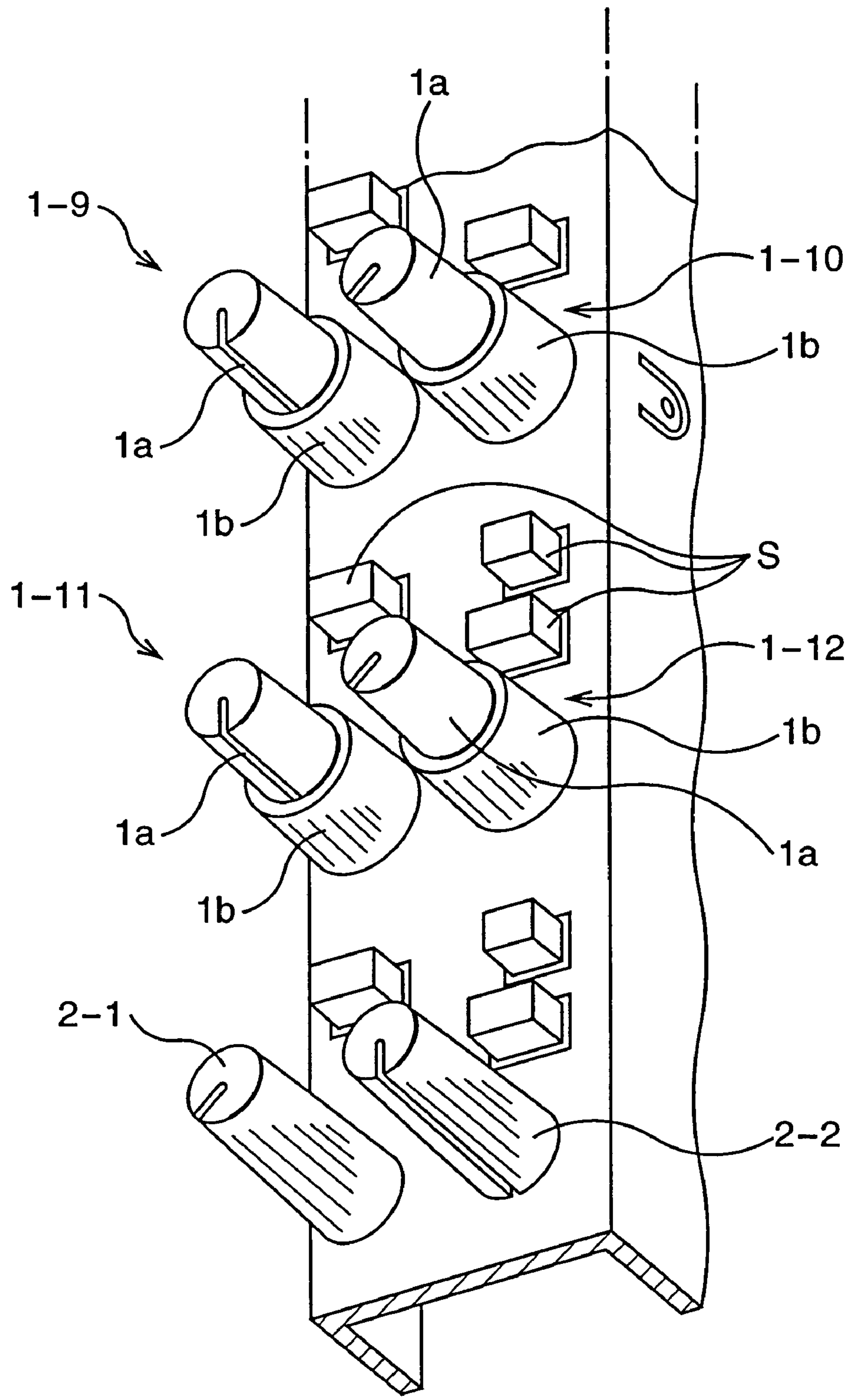
FIG. 4 is a perspective view of volume operators on the mixing console according to the embodiment of the present invention.

The volume operators 1-1 to 1-12 in the group operation section A1 are coaxial (pluriaxial) dial-type operators, while the volume operators 2-1 to 2-8 in the group operation section A2 are monoaxial dial-type operators. FIG. 4 is a perspective view of volume operators, showing volume operators 1-9 to 1-12 and volume operators 2-1 and 2-2 as an example. As shown, each of the volume operators 1-1 to 1-12 is made up so that a high-height inner level volume knob 1*a* and a low-height outer pan volume knob 1*b* are arranged coaxially. In this arrangement, the level volume knob 1*a* is rotated to adjust the level volume 5*c* and the pan volume knob 1*b* is rotated to adjust the pan volume 5*c*. Further, the volume operators 2-1 to 2-8 are rotated to adjust respective level volumes 7*b*.

The group operation section A1 is further divided into three subgroups A1-1 to A1-3, each consisting of four operators, that is, subgroups of volume operators 1-1 to 1-4, volume operators 1-5 to 1-8, and volume operators 1-9 to 1-12. The volume operators 1-1 to 1-4 in the subgroup A1-1 are orange-tinted for marking. The volume operators 1-5 to 1-8 in the subgroup A1-2 are light blue-tinted for visual marking. The volume operators 1-9 to 1-12 in the subgroup A1-3 are purple-tinted.

On the other hand, the group operation section A2 is further divided into two subgroups A2-1 and A2-2, each consisting of four operators, that is, subgroups of volume operators 2-1 to 2-4 and volume operators 2-5 to 2-8. The volume operators 2-1 to 2-4 in the subgroup A2-1 are orange-tinted as marking, and the volume operators 2-5 to 2-8 in the subgroup A2-2 are light blue-tinted for different marking. Changing the colors of respective sets of operators is made by mixing each coloring material into a synthetic resin in the process of molding each operator (knob), for example.

Figure 2:
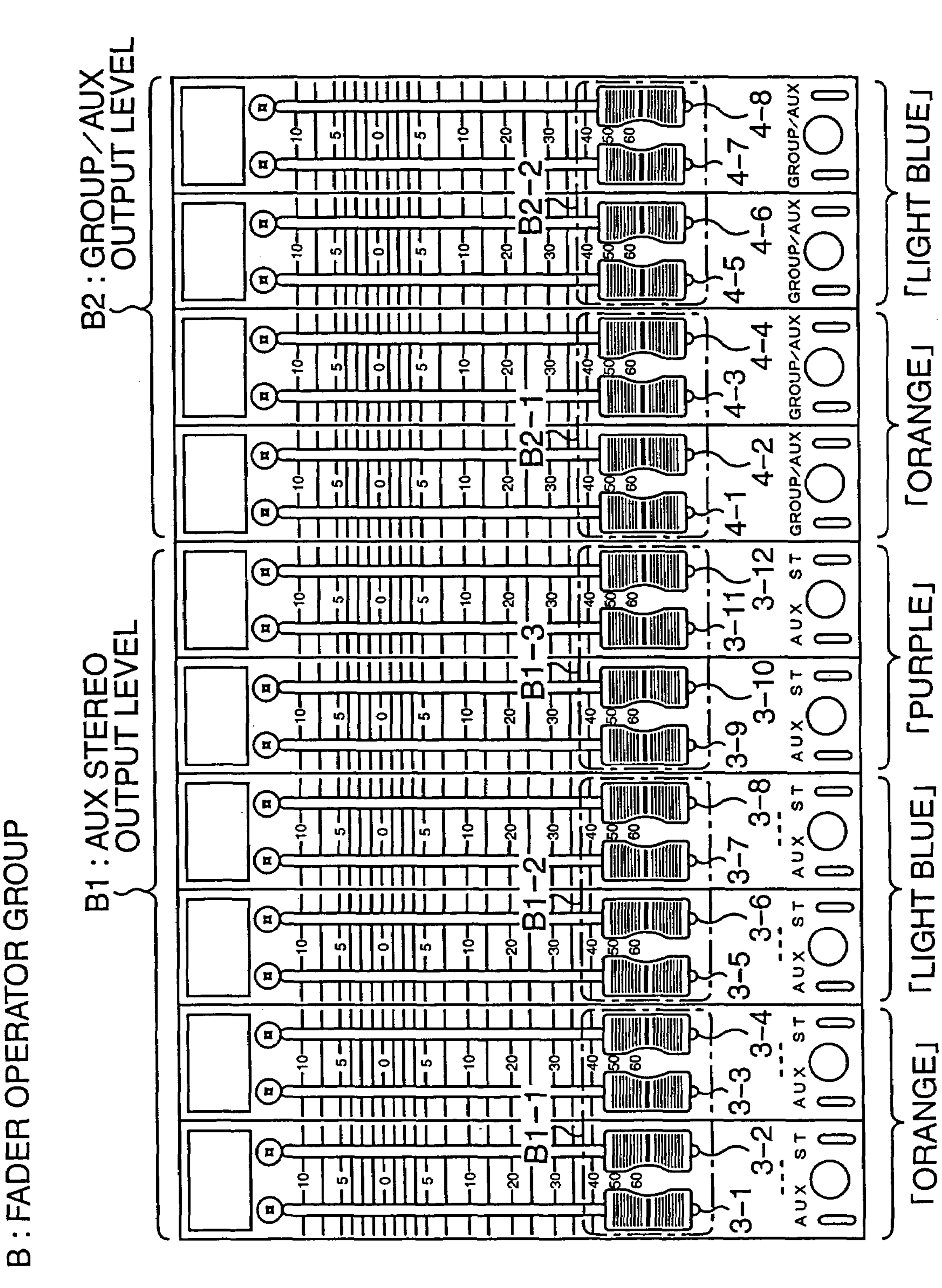
FIG. 2 is a plan view showing a fader operator group on a mixing console according to the embodiment of the present invention.

FIG. 2 is a plan view showing the fader operator group B. The fader operator group B is divided into two group operation sections B1 and B2. The group operation section B1 consists of 12 fader operators 3-1 to 3-12 for faders 30*b*, 30*b* in the 12 sets of AUX stereo output level control circuits 30. The group operation section B2 consists of eight fader operators 4-1 to 4-8 for faders 50*b* in the eight sets of GROUP/AUX output level control circuits 50.

The group operation section B1 is further divided into three subgroups B1-1 to B1-3, each consisting of four operators, that is, subgroups of fader operators 3-1 to 3-4, fader operators 3-5 to 3-8, and fader operators 3-9 to 3-12. The fader operators 3-1 to 3-4 in the subgroup B1-1 are orange-tinted as marking. The fader operators 3-5 to 3-8 in the subgroup B1-2 are light blue-tinted. The fader operators 3-9 to 3-12 in the subgroup B1-3 are purple-tinted. In this example, the brightness of the subgroup B1-1 (orange-tinted) is the largest among the subgroups B1-1, B1-2 and B1-3. The brightness of the subgroup B1-3 (purple-tinted) is the smallest among the subgroups B1-1, B1-2 and B1-3. The brightness of the subgroup B1-2 (light blue-tinted) is in between those of the subgroups B1-1 and B1-3.

On the other hand, the group operation section B2 is further divided into two subgroups B2-1 and B2-2, each consisting of four operators, that is, subgroups of fader operators 4-1 to 4-4 and fader operators 4-5 to 4-8. The fader operators 4-1 to 4-4 in the subgroup B2-1 are orange-tinted, and the fader operators 4-5 to 4-8 in the subgroup B2-2 are light blue-tinted. The brightness of the subgroup B2-1 (orange-tinted) is the larger than that of the subgroup B2-2 (light blue-tinted).

As stated above, since each subgroup of each group operation section is marked with a color different from any other subgroup of the same group operation section, the arrangement of volume operators or fader operators can be recognized on a subgroup basis, thereby making it very easy to find each operator. In other words, an individual operator can be found by perceiving its subgroup first and then selecting the target operator from the subgroup. While this might seem to be a troublesome procedure because of the need to go through two steps, in actual operational circumstances any human operator can almost mechanically (unconsciously) distinguish not only each subgroup but also each operator from the others of the subgroup.

Imagine that one operator needs to be addressed from among all the operators without any marking. In this case, it is necessary for the human operator to recognize the position of the operator with respect to the whole arrangement, and this operation would be troublesome. In contrast, in the embodiment, respective subgroups are marked with different colors, so that any subgroup can be distinguished at a glance. Further, since the target operator has only to be selected within the subgroup (from a much smaller number of operators (four in this example) than the total number of operators), the human operator can easily find the target operator. Especially, since a very small number of operators (four in this example) belong in each subgroup, the human operator can grope for a desired operator. In other words, the human operator can find the target operator using at-a-glance and trial-and-error methods.

Further, for example, in the volume operator group A (FIG. 1), although the AUX stereo send level group operation section A1 and the GROUP/AUX send level group operation section A2 are in tandem with each other despite their different functions, since the top subgroups of the group operation sections A1 and A2 are marked with the same color (orange in this example), the human operator can easily recognize the arrangement of the group operation sections such that, for example, the top of each group operation section is marked with orange. This also works in the same manner on the relationship between the group operation sections B1 and B2 in the fader operator group B (FIG. 2). In addition, in the embodiment, the top subgroup is marked with orange, only the brightest color, and this also makes it easy to recognize the order of each group operation section.

Furthermore, the same sequence of marking colors are used commonly for all the group operation sections A1, A2, and B1, B2 (in this example, the first is orange and the second is light blue), so that the order of colors can be easily remembered, thereby improve operationality.

Furthermore, the group operation section A1 in the volume operator group A and the group operation section B1 in the fader operator group B, and the group operation section A2 in the volume operator group A and the group operation section B2 in the fader operator group B are marked in the same way (in the same order of colors). In other words, the relationship between the AUX stereo send levels (FIG. 1) and the AUX stereo output levels (FIG. 2), and the relationship between the GROUP/AUX send levels (FIG. 1) and the GROUP/AUX output levels (FIG. 2) can be readily recognized through their markings, and this also helps improve operationality. Note that the group operation section A1 and the group operation section B1 correspond to the "first group operation section" and the "second group operation section," respectively. Similarly, the group operation section A2 and the group operation section B2 correspond to the "first group operation section" and the "second group operation section," respectively.

The colors of respective markings are not limited to those in the above-mentioned embodiment. It is needless to say that any other colors can be used. Further, although the material of each operator itself is colored in the above-mentioned embodiment, respective colors of seals or labels can be used as markings so that each subgroup will be distinguished from one another.

The above-mentioned type of mixing console is often used in a dark place such as the backroom of a theater or hall. Even in the dark place, the human operator readily recognizes the knob groups according to the brightness of the color markings applied to the respective knobs. More expediently, fluorescent colors can be used as markings to make it easy to recognize the markings in the dark place. Further, since small lighting equipment is often provided above the panel, colors that become vivid when exposed to the light, such as to generate fluorescence (fluorescent paints or the like), may be used.

The way of marking is not limited to changing in color, and can also be applied to shape, light-emitting, and notch in part of each operator.

In terms of human engineering, distance between subgroups in the volume operator group A is set to fall within the span (pitch) of the thumb to any other finger. Further, according to this distance, the number of operators in each subgroup is set. In other words, although in the embodiment one subgroup consists of four operators, the number of operators may be two, three, five, or more than five. Note that the number of operators in one subgroup varies depending on the size of each operator. The larger the size of each operator, the more the number of operators in one subgroup. In contrast, the smaller the size of each operator, the less the number of operators in one subgroup, but the upper limit of the number of operators depends on the distance between subgroups set in the above-mentioned manner.

Note further that switches S (which may also be LEDs) arranged between the volume operators 1-9, 1-10 and the volume operators 1-11, 1-12 also serve as accents to determine the distance between the volume operators 1-9, 1-10, and the volume operators 1-11, 1-12. Further, the distance between operators has to be wide enough for at least one thumb.

The above-mentioned embodiment is a mixing console in a mixer apparatus as an example, but the present invention may also be applied to a recorder or the like having mixing capabilities.

According to the first aspect of the invention, the mixing console allows a human operator to recognize the arrangement of manual control operators on a subgroup basis, thereby making it easy for the human operator to find each operator.

According to the second aspect of the invention, since respective top subgroups in the plurality of group operation sections have the same marking, the mixing console can obtain not only the same effects as those in the first aspect of the invention, but also make it easy to distinguish one group operation section from another, and hence to find the top of the operators of the distinguished group operation section.

According to the third aspect of the invention, since the order of subgroups of the plurality of group operation sections corresponds to the order of kinds of markings, the mixing console can obtain not only the same effects as those in the first aspect of the invention, but also make it easy to recognize the order of subgroups, thereby improving opeationality.

According to the fourth aspect of the invention, since the relationship between the first and second group operation sections can be recognized with the markings, the mixing console can obtain not only the same effects as those in the first aspect of the invention, but also improve operatinality.

What is claimed is:

1. A mixing console apparatus comprising:

an input section that inputs a plurality of electric signals;

a processing section that processes the inputted electric signals;

an output section that outputs the processed electric signals; and a plurality of operators being provided in correspondence to a plurality of circuit components contained in those of the input section, the processing section and the output section, and being assigned with various functions in correspondence to the respective circuit components, the plurality of operators being manually operable to act on the corresponding circuit components for controlling the electric signals, said plurality of operators being divided into groups and subgroups, wherein the plurality of the operators are arranged to form a plurality of group operation sections such that the respective group operation sections have specific functions that are different from each other, wherein the plurality of the group operation sections are arranged in tandem with each other, wherein each group operation section is divided into subgroups with color markings such that operators belonging to one subgroup is distinguished from operators belonging to another subgroup by the respective color markings, wherein the subgroups belonging to one group operation section and the subgroup belonging to another group operation section correspond to each other, such that the corresponding subgroups include the same number of operators in the same arrangement, wherein all of the subgroups belonging to the plurality of the group operation sections are arranged in tandem, and the sequence of the subgroups in one group operation section is the same as the sequence of the subgroups in another group operation section, and wherein the color marking have a predetermined order, such that the color markings are applied sequentially to the sequence of the subgroups in the same manner among the respective group operation sections according to the predetermined order, so that the corresponding subgroups have the same color marking.

2. The mixing console apparatus according to claim 1, wherein different colors are allocated to different subgroups to distinguish from each other.

3. The mixing console apparatus according to claim 2, wherein the different colors are allocated in the order determined by brightness thereof to the different subgroups.

4. A mixing console apparatus comprising:

an input section that inputs a plurality of electric signals;

a processing section that processes the inputted electric signals;

an output section that outputs the processed electric signals;

a bus system connecting between the input section and the output section through the processing section; and a plurality of operators being provided in correspondence to a plurality of circuit components of the processing section disposed on the bus system and being assigned with various functions in correspondence to the respective circuit components, the plurality of operators being manually operable to act on the corresponding circuit components for processing the electric signals, said plurality of operators being divided into groups and subgroups, wherein the plurality of the operators are arranged to form a first group operation section and a second group operation section, such that operators corresponding to circuit components disposed on an input side of the bus system are grouped into the first group operation section and operators corresponding to circuit component disposed on an output side of the bus system are grouped into the second group operation section, wherein the first group operation section and the second group operation section have specific functions that are different from each other, wherein the first group operation section is divided into subgroups with color markings such that operators belonging to one subgroup is distinguished from operators belonging to another subgroup by the respective color markings, and the second group operation section is divided into subgroups in correspondence to the subgroups of the first group operation section with color markings such that operators belonging to one subgroup is distinguished from operators belonging to another subgroup by the respective color markings, and wherein the subgroups of the first group operation section have the same corresponding marking as that of the corresponding subgroups of the second group operation section, wherein the subgroups of the first group operation section and the subgroups of the second group operation section correspond to each other, such that the corresponding subgroups have the same number of operators in the same arrangement, wherein the subgroups of the first group operation section and the subgroups of the second group operation section are arranged in tandem, and the sequence of the subgroups in the first group operation section is the same as the sequence in the second group operation section, and wherein the color markings have a predetermined order, such that the color markings are applied sequentially to the sequence of the subgroups in the same manner amongst the first and the second group operation sections according to the predetermined order, so that the corresponding subgroups have the same color markings.

* * * * *